(12) United States Patent
Karakama et al.

(10) Patent No.: US 10,281,864 B2
(45) Date of Patent: May 7, 2019

(54) IMAGE FORMING APPARATUS

(71) Applicant: Konica Minolta, Inc., Tokyo (JP)

(72) Inventors: Sho Karakama, Sagamihara (JP); Masahiko Tanaka, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 6 days.

(21) Appl. No.: 15/824,565

(22) Filed: Nov. 28, 2017

(65) Prior Publication Data

US 2018/0164730 A1  Jun. 14, 2018

(30) Foreign Application Priority Data

Dec. 8, 2016  (JP) .................. 2016-238580

(51) Int. Cl.
| | |
|---|---|
| *B65H 1/04* | (2006.01) |
| *B65H 1/26* | (2006.01) |
| *G03G 15/00* | (2006.01) |
| *G03G 21/16* | (2006.01) |
| *H04N 1/00* | (2006.01) |
| *B65H 1/14* | (2006.01) |

(52) U.S. Cl.
CPC .......... *G03G 15/6502* (2013.01); *B65H 1/04* (2013.01); *B65H 1/14* (2013.01); *B65H 1/266* (2013.01); *G03G 21/1695* (2013.01); *H04N 1/00* (2013.01); *H04N 1/00533* (2013.01); *B65H 2402/32* (2013.01); *B65H 2402/541* (2013.01); *B65H 2405/121* (2013.01); *B65H 2405/31* (2013.01); *B65H 2405/322* (2013.01); *B65H 2601/322* (2013.01); *B65H 2801/03* (2013.01); *B65H 2801/12* (2013.01)

(58) Field of Classification Search
CPC ...... B65H 1/266; B65H 1/04; B65H 2405/31; G03G 15/6502

See application file for complete search history.

(56) References Cited

U.S. PATENT DOCUMENTS

| | | | |
|---|---|---|---|
| 8,205,875 B2 * | 6/2012 | Kusumi | B65H 5/38 |
| | | | 271/162 |
| 8,509,673 B2 * | 8/2013 | Seto | B65H 1/266 |
| | | | 271/9.08 |
| 9,104,161 B2 * | 8/2015 | Hori | G03G 15/6505 |
| 9,415,958 B2 * | 8/2016 | Kubota | B65H 1/266 |

FOREIGN PATENT DOCUMENTS

| | | | |
|---|---|---|---|
| JP | 2005263346 A | * | 9/2005 |
| JP | 2008127110 A | | 6/2008 |
| JP | 2009073572 A | * | 4/2009 |
| JP | 2010222113 A | | 10/2010 |
| JP | 2012001326 A | * | 1/2012 |
| JP | 2012006735 A | | 1/2012 |

\* cited by examiner

*Primary Examiner* — Luis A Gonzalez
(74) *Attorney, Agent, or Firm* — Lucas & Mercanti, LLP

(57) ABSTRACT

Provided is an image forming apparatus provided with a sheet accommodating member that accommodates a sheet and is capable of being inserted into and withdrawn from an apparatus main body, and the image forming apparatus includes: a moving member movably supported in the sheet accommodating member; a charge member that is charged with energy by a movement of the moving member; and a retractor that retracts the sheet accommodating member into the apparatus main body by the energy charged in the charge member, when the sheet accommodating member is inserted into the apparatus main body.

10 Claims, 12 Drawing Sheets

IMAGE FORMING APPARATUS

Japanese Patent Application No. 2016-238580 filed on Dec. 8, 2016, including description, claims, drawings, and abstract the entire disclosure is incorporated herein by reference in its entirety.

BACKGROUND

Technological Field

The present invention relates to an image forming apparatus such as a copying machine, a printer, a facsimile, and a multifunction machine of those. Particularly, the present invention has a feature of easy insertion of a sheet accommodating member into an apparatus main body of the image forming apparatus, when the sheet accommodating member such as a sheet cassette that accommodates sheets is provided capable of being inserted into and withdrawn from the apparatus main body.

Description of the Related Art

Conventionally, in an image forming apparatus such as a copying machine, a printer, a facsimile, and a multifunction machine of those, a sheet accommodating member such as a sheet cassette that accommodates sheets is generally provided capable of being inserted into and withdrawn from an apparatus main body of the image forming apparatus.

Here, when a sheet accommodating member such as a sheet cassette that accommodates sheets is to be thus inserted into and withdrawn from the apparatus main body, since accommodating a large number of sheets in the sheet accommodating member increases weight of the sheet accommodating member, and increases a frictional force between the sheet accommodating member thus having the increased weight and the guide rail or the like that guides the sheet accommodating member into the apparatus main body, as well as due to a locking force for locking such a sheet accommodating member at a predetermined position, an operation force for setting the sheet accommodating member is increased.

Conventionally, as disclosed in JP 2010-222113 A, there is proposed a device provided with a draw-in mechanism to retract a sheet cassette into an apparatus main body. The draw-in mechanism includes: a charge spring that charges energy interlockingly with drawing of the sheet cassette; a lock member that locks the charge spring in a state where energy is charged; a ratchet mechanism that releases interlock between the charge spring and the sheet cassette relative to a movement of the sheet cassette in a push-in direction; and a lock releasing member that releases the lock while interlocking the sheet cassette and the charge spring at a final stage of the movement of the sheet cassette in the push-in direction. In the device, the sheet cassette is moved to the push-in direction by the energy charged at the last stage of the movement of the sheet cassette in the push-in direction.

However, in the device disclosed in JP 2010-222113 A, for moving the sheet cassette in the push-in direction, since energy is charged into the charge spring in drawing of the sheet cassette as described above, a user has to pull with a large force opposing the force of the charge spring for withdrawing the sheet cassette from the apparatus main body. On the other hand, in automatically withdrawing the sheet cassette by the charge spring, the sheet cassette has to be pushed with a force opposing the charge spring when the sheet cassette is pushed. Therefore, in the device disclosed in JP 2010-222113 A, while operability is improved for one direction of moving the sheet cassette, operability is deteriorated in the opposite direction.

Further, as disclosed in JP 2008-127110 A, it has conventionally been disclosed that operability at a time of drawing of a unit such as a removable paper feeding cassette is improved, by turning on a solenoid to energize a unit such as a paper feeding cassette in a withdrawing direction through a spring when a unit such as the paper feeding cassette or the like is inserted into a predetermined position of a main body, while a lock mechanism inhibits a movement of the unit such as the paper feeding cassette at that time, and releasing the elastic force of the charged energizing spring to energize the unit such as the paper feeding cassette in the withdrawing direction when the paper feeding cassette is withdrawn.

However, JP 2008-127110 A discloses no enhancement of operability of inserting the unit such as the paper feeding cassette into the apparatus main body.

SUMMARY

An object of the present invention is to enable easy insertion of a sheet accommodating member into an apparatus main body when the sheet accommodating member such as a sheet cassette that accommodates sheets is provided capable of being inserted into and withdrawn from the apparatus main body of an image forming apparatus.

To achieve the abovementioned object, according to an aspect of the present invention, there is provided an image forming apparatus provided with a sheet accommodating member that accommodates a sheet and is capable of being inserted into and withdrawn from an apparatus main body, and the image forming apparatus reflecting one aspect of the present invention comprises: a moving member movably supported in the sheet accommodating member; a charge member that is charged with energy by a movement of the moving member; and a retractor that retracts the sheet accommodating member into the apparatus main body by the energy charged in the charge member, when the sheet accommodating member is inserted into the apparatus main body.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an image forming apparatus according to one or more embodiments of the present invention will be specifically described with reference to the drawings. However, the image forming apparatus according to the present invention is not limited to the disclosed embodiments. The image forming apparatus according to the present invention can be implemented with appropriate modifications within the scope without changing the gist thereof.

Figure 1:
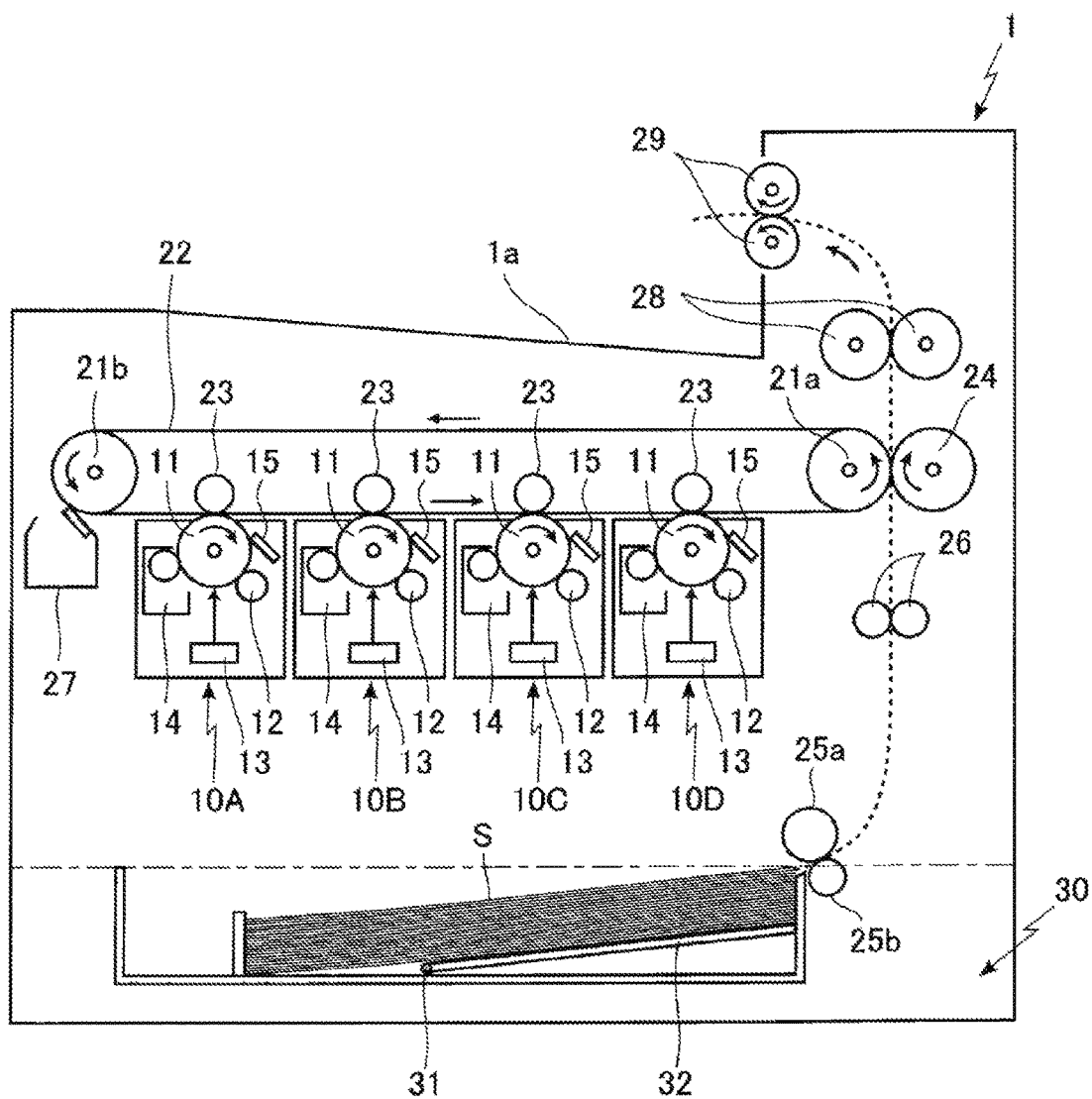
FIG. 1 is a schematic explanatory view showing an example of an image forming apparatus according to an embodiment of the present invention.

In the image forming apparatus according to the embodiment of the present invention, as shown in FIG. 1, four imaging cartridges 10A to 10D are mounted inside an apparatus main body 1.

Here, each of the imaging cartridges 10A to 10D is provided with: a photoreceptor 11; a charging device 12 that charges a surface of the photoreceptor 11; a latent image forming device 13 that forms an electrostatic latent image on the surface of the photoreceptor 11 by performing exposure on the surface of the charged photoreceptor 11 in accordance with image information; a developing device 14 that supplies toner to the electrostatic latent image formed on the surface of the photoreceptor 11, to form a toner image; and a first cleaning device 15 that removes residual toner from the surface of the photoreceptor 11 after transferring of the toner image formed on the surface of the photoreceptor 11 to an intermediate transfer belt 22.

Further, in the developing devices 14 of the imaging cartridges 10A to 10D, toners of different colors are accommodated, and toners of black, yellow, magenta, and cyan are accommodated.

In this image forming apparatus, toner images of respective colors are formed on surfaces of the respective photoreceptors 11 in the imaging cartridges 10A to 10D by charging the surface of each photoreceptor 11 with the charging device 12; performing exposure on the surface of each photoreceptor 11 thus charged, by the latent image forming device 13, in accordance with image information; forming an electrostatic latent image in accordance with image information on the surface of each photoreceptor 11; and supplying the toner of each color to the electrostatic latent image thus formed on the surface of each photoreceptor 11, from each developing device 14.

Next, a composite toner image is formed on the intermediate transfer belt 22 by sequentially transferring, with a primary transfer roller 23, the toner images of the respective colors thus formed on the surfaces of the photoreceptors 11 in the respective imaging cartridges 10A to 10D onto the intermediate transfer belt 22 laid and driven to rotate around a driving roller 21a and a rotating roller 21b. While the toner image thus formed is guided by the intermediate transfer belt 22 to a position facing a secondary transfer roller 24, residual toner on the surface of each photoreceptor 11 after the transfer is removed from the surface of the photoreceptor 11 by each corresponding first cleaning device 15.

Figure 2:
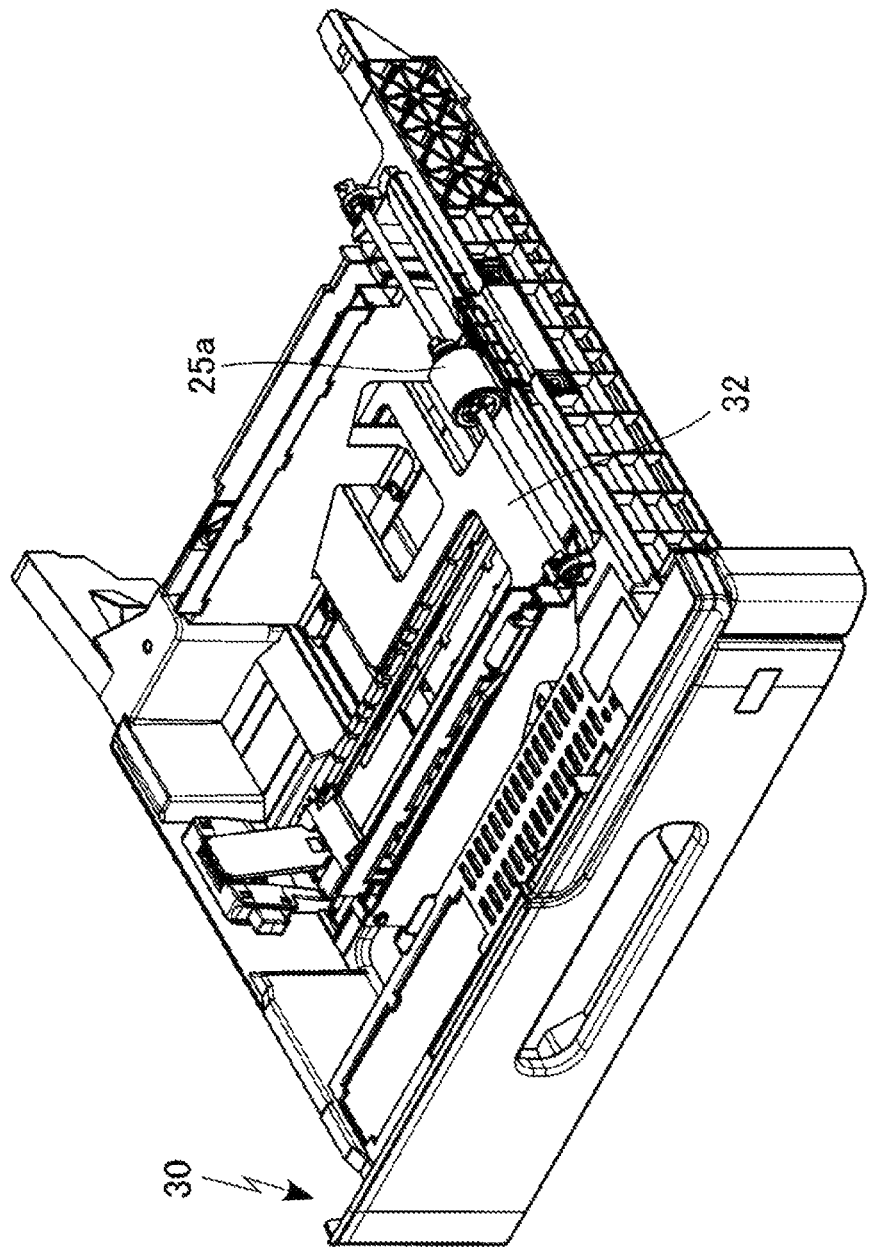
FIG. 2 is a schematic perspective view of a sheet cassette (sheet accommodating member) used in the image forming apparatus according to the embodiment.
Figure 3:
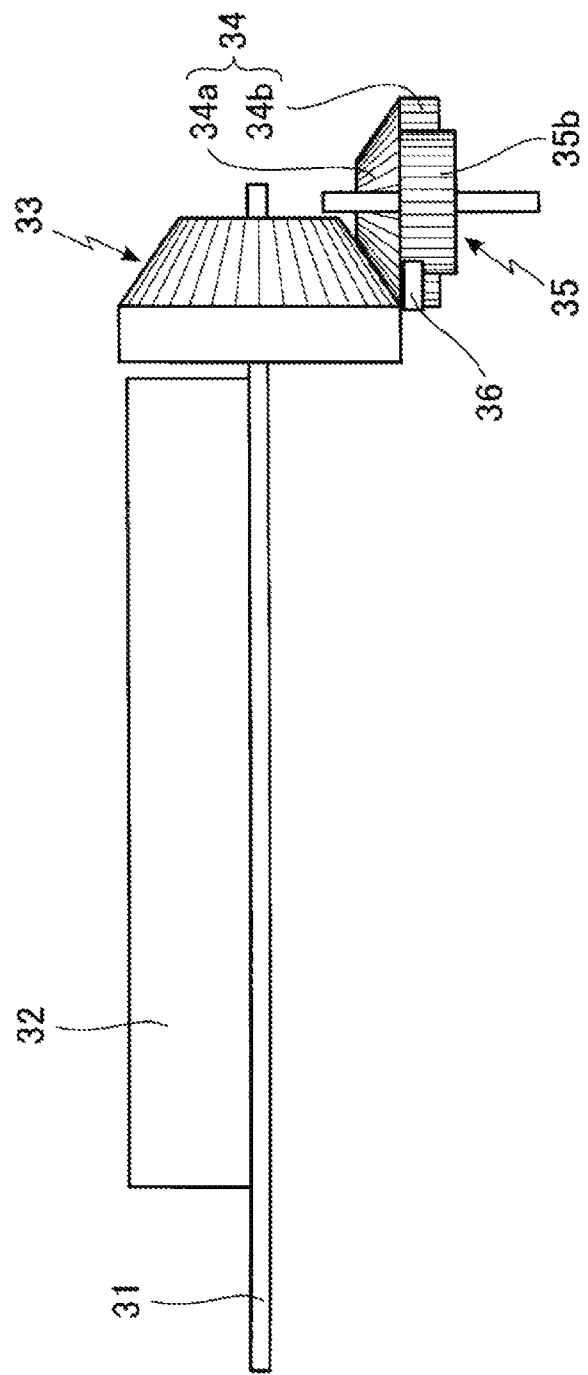
FIG. 3 is a schematic explanatory view of a state viewed from a side opposite to a sheet feeding direction, showing a first example in which a charge member is charged with energy by using, as a moving member, a push-up plate that is vertically rotated about a support shaft as a fulcrum, in the image forming apparatus according to the embodiment.

In such an image forming apparatus, there is provided a sheet cassette 30, as shown in FIG. 2, capable of being inserted into and withdrawn from a lower part in the apparatus main body 1, as a sheet accommodating member 30 that accommodates a sheet S.

In this embodiment, there is provided a push-up plate 32 that is vertically rotated about a support shaft 31 as a fulcrum in the sheet cassette 30. With a plurality of sheets S stacked on the push-up plate 32, the push-up plate 32 is rotated upward to bring the sheet S stacked on the push-up plate 32 and positioned above into contact with a feed roller 25a. The sheet S stacked on the push-up plate 32 is fed by the feed roller 25a, while the sheets S are separated between the feed roller 25a and a separation roller 25b provided facing the feed roller 25a when a plurality of sheets S are fed so that one sheet S alone is fed, allowing the one sheet S thus fed to be guided to a timing roller 26.

Then, the sheet S is guided by the timing roller 26 between the intermediate transfer belt 22 and the secondary transfer roller 24 at an appropriate timing, and the toner image formed on the intermediate transfer belt 22 is transferred to the sheet S by the secondary transfer roller 24. Residues such as toner remaining on the intermediate transfer belt 22 without being transferred to the sheet S are removed from the intermediate transfer belt 22 by a second cleaning device 27.

On the other hand, the sheet S having the transferred toner image as described above is guided to a heat fixing roller 28, the unfixed toner image transferred onto the sheet S is heated and fixed on the sheet S in this heat fixing roller 28, and the sheet S having the toner image thus fixed is discharged to a sheet discharge part 1a of the apparatus main body 1 by the sheet discharge roller 29.

Here, description will be given of a first example in which the sheet cassette 30 is inserted into the apparatus main body 1 after the sheet cassette 30 is taken out of the apparatus main body 1, in the above embodiment.

In the first example, the push-up plate 32 is used as a moving member, as shown in FIGS. 3 to 8. In the support shaft 31 that vertically rotates the push-up plate 32, there are provided a bevel gear 33 having a one-way clutch 33a at one end part of the support shaft 31 on a side from which the sheet cassette 30 is withdrawn, and a rotation transmission gear 34 in which a gear part 34b is provided under a bevel gear part 34a engaged with the bevel gear 33. Further, a gear part 35b is provided on a charge member 35 provided with a charge part 35a to be charged with energy, and the gear part 35b of the charge member 35 is provided to be engaged with the gear part 34b of the rotation transmission gear 34.

When the charge part 35a of the charge member 35 is charged with energy, in order to suppress a rotation of the gear part 35b of the charge member 35 in the direction opposite to that in charging due to the charged energy while being engaged with the gear part 34b of the rotation transmission gear 34, a locking member 36 is locked to the gear part 35b of the charge member 35 to suppress free release of the energy charged in the charge part 35a.

Figure 4:
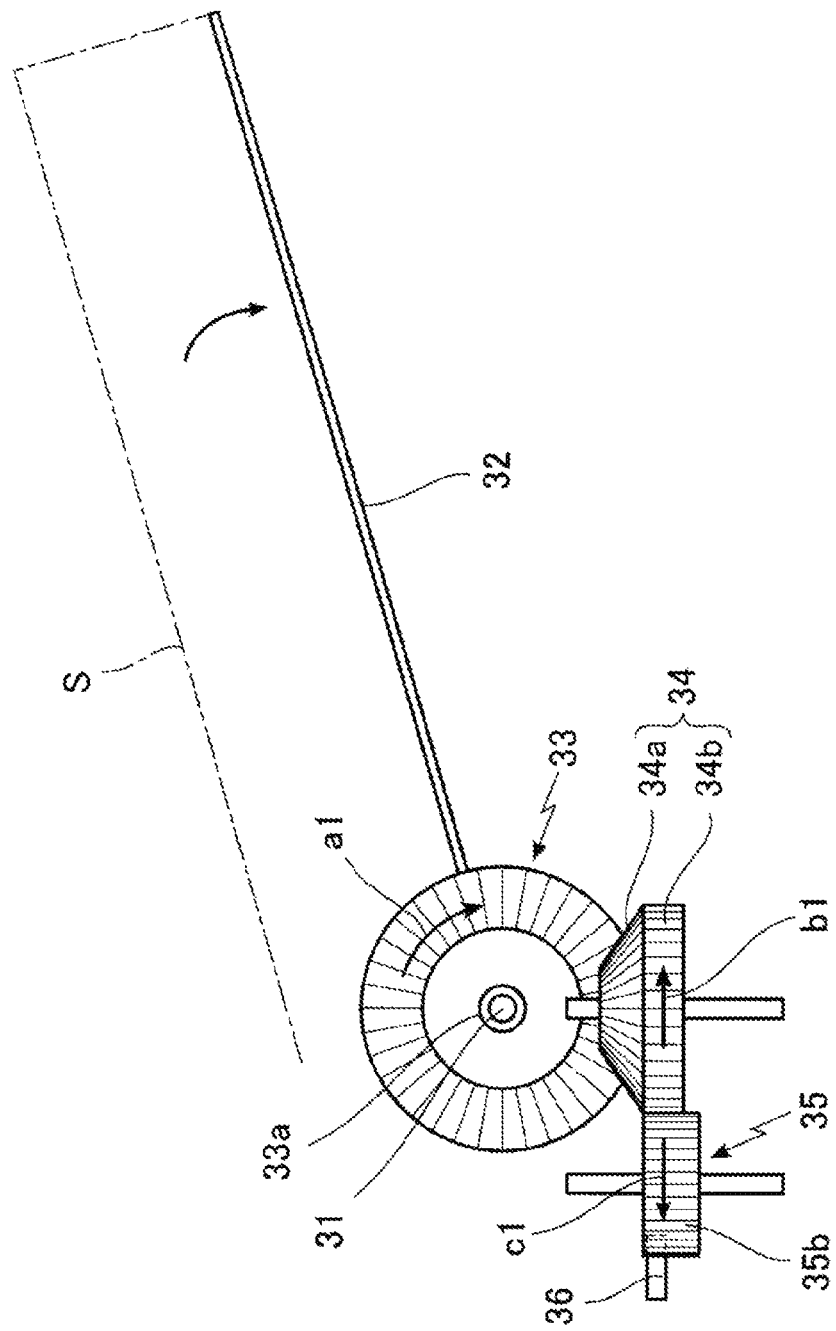
FIG. 4 is a schematic explanatory view as viewed from a withdrawing direction side, showing a state where the charge member is charged with energy by stacking sheets on the push-up plate to downwardly rotate the push-up plate, and transmitting a rotation of a bevel gear provided on the support shaft of the push-up plate to the charge member via a rotation transmission gear, in the first example.

Here, in the first example, as shown in FIG. 4, when the sheet S is stacked on the push-up plate 32, the push-up plate 32 is rotated downward about the support shaft 31 as a fulcrum, and the bevel gear 33 provided with the one-way clutch 33a provided to the support shaft 31 is accordingly rotated in the direction of an arrow a1.

Figure 5:
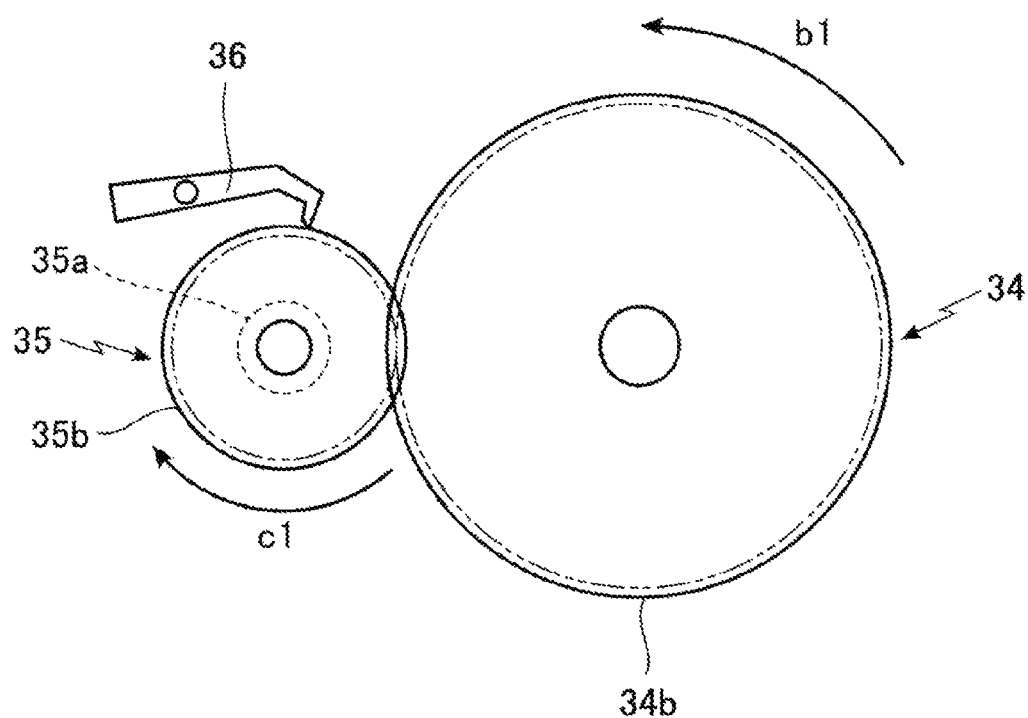
FIG. 5 is a partial schematic explanatory view showing a state where the charge member is charged with energy by rotating the charge member along with a rotation of the rotation transmission gear, in the first example.

As the bevel gear 33 rotates, the rotation transmission gear 34 having the bevel gear part 34a engaged with the bevel gear 33 is rotated in the direction of an arrow b1. Then, as shown in FIGS. 4 and 5, the charge member 35 is rotated in the direction of an arrow c1 via the gear part 35b of the charge member 35 in a state being engaged with the gear part 34b of the rotation transmission gear 34 thus rotated, causing the charge part 35a of the charge member 35 to be charged with energy.

Figure 6:
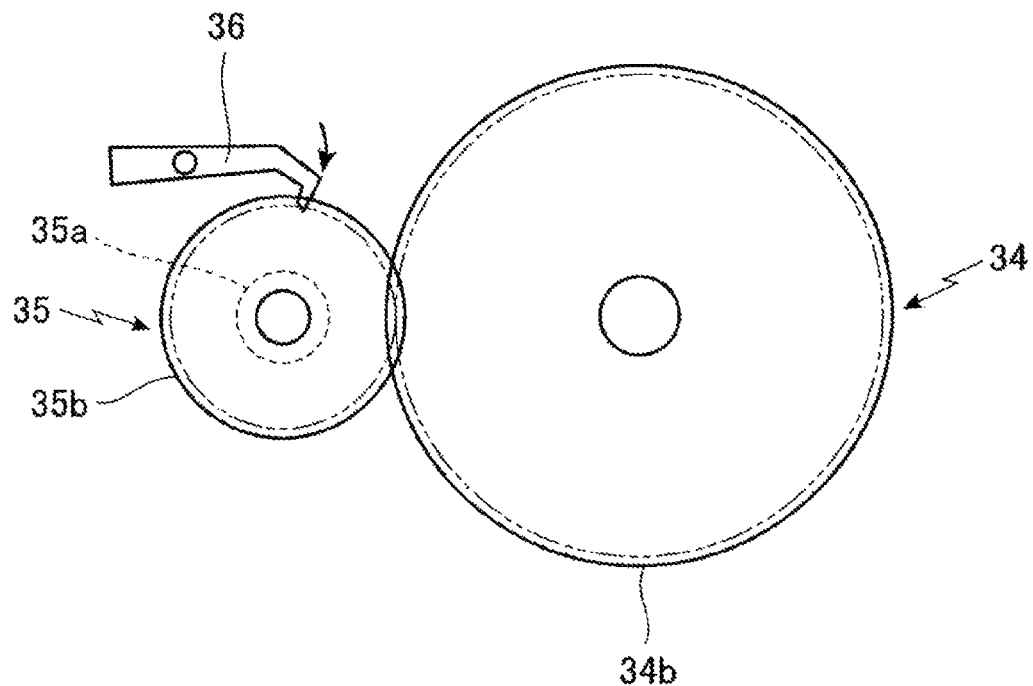
FIG. 6 is a partial schematic explanatory view showing a state where a locking member is locked to the charge member with energy charged in the charge member, to inhibit a rotation of the charge member in a direction opposite to that in charging, in the first example.

Here, after the charge part 35a of the charge member 35 is thus charged with energy, the locking member 36 is locked to the gear part 35b of the charge member 35 as shown in FIG. 6, to suppress a rotation of the charge member 35 in the direction opposite to that in charging, to inhibit free release of the energy charged in the charge part 35a.

Figure 7:
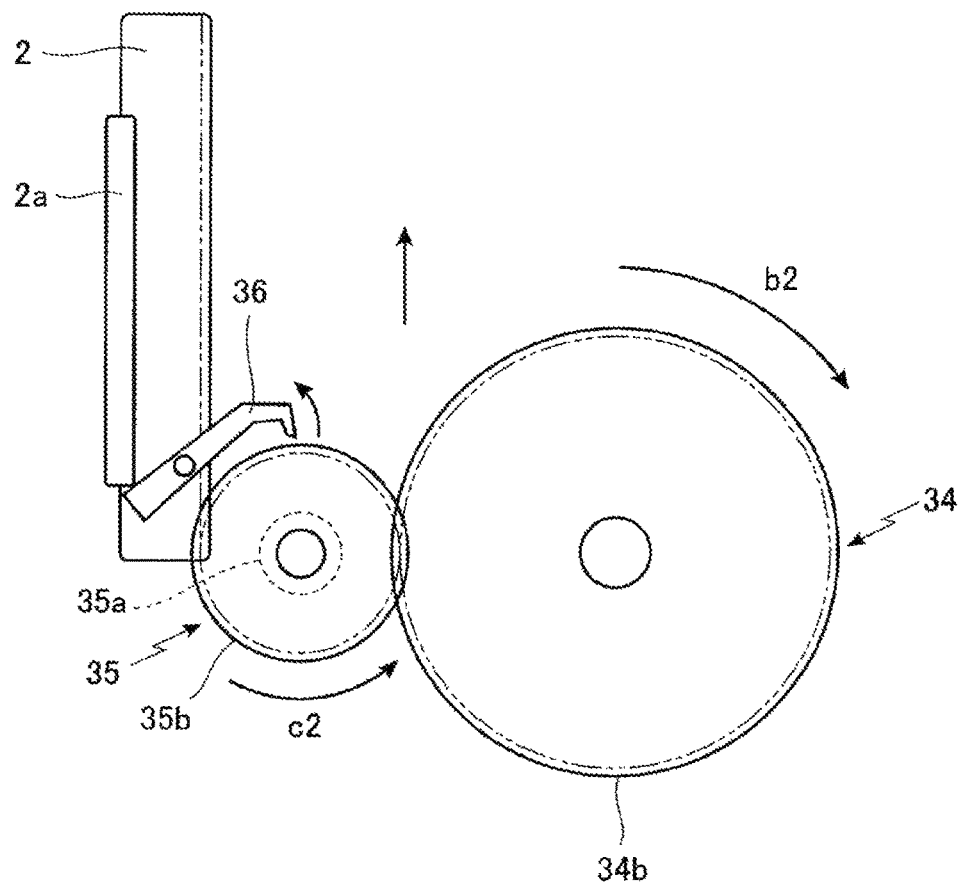
FIG. 7 is a partial schematic explanatory view showing a state where the sheet cassette is retracted into the apparatus main body by engaging the charge member with a rack member provided in the apparatus main body, detaching the locking member from the charge member, and rotating the charge member in the direction opposite to that in charging while being engaged with the rack member, for inserting the sheet cassette into the apparatus main body in a state where the charge member is charged with energy, in the first example.

Then, for inserting the sheet cassette 30 into the apparatus main body 1 in a state where the charge part 35a of the charge member 35 is thus charged with energy, the gear part 35b of the charge member 35 is engaged with a rack member 2 provided inside the apparatus main body 1, as shown in FIG. 7, and the locking member 36 that has been locked to the gear part 35b of the charge member 35 is detached from the gear part 35b of the charge member 35 by an unlocking member 2a provided on the rack member 2.

As a result, the energy charged in the charge part 35a of the charge member 35 causes the gear part 35b of the charge member 35 to be engaged with the rack member 2 provided in the apparatus main body 1, to be rotated in the direction of an arrow c2 opposite to that in charging. In this case, the rotation transmission gear 34 is also rotated in the direction of the arrow c2 opposite to that in charging. However, the bevel gear 33 having the one-way clutch 33a is maintained without being rotated, due to an action of the one-way clutch 33a.

Figure 8:
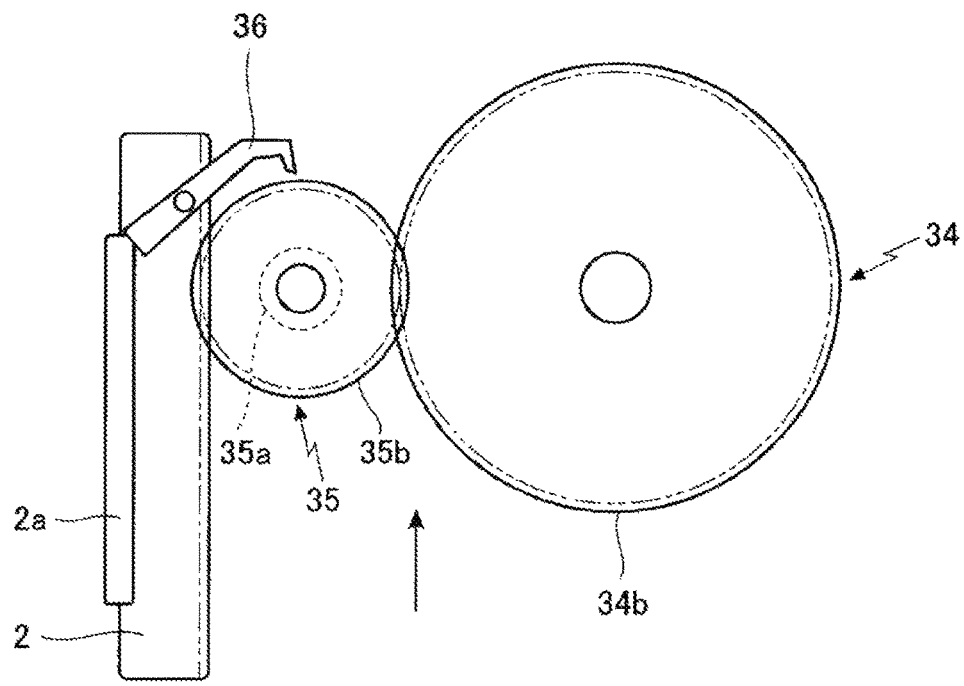
FIG. 8 is a partial schematic explanatory view showing a state where the sheet cassette is retracted into the apparatus main body by rotating the charge member in the direction opposite to that in charging, in the first example.
Figure 9:
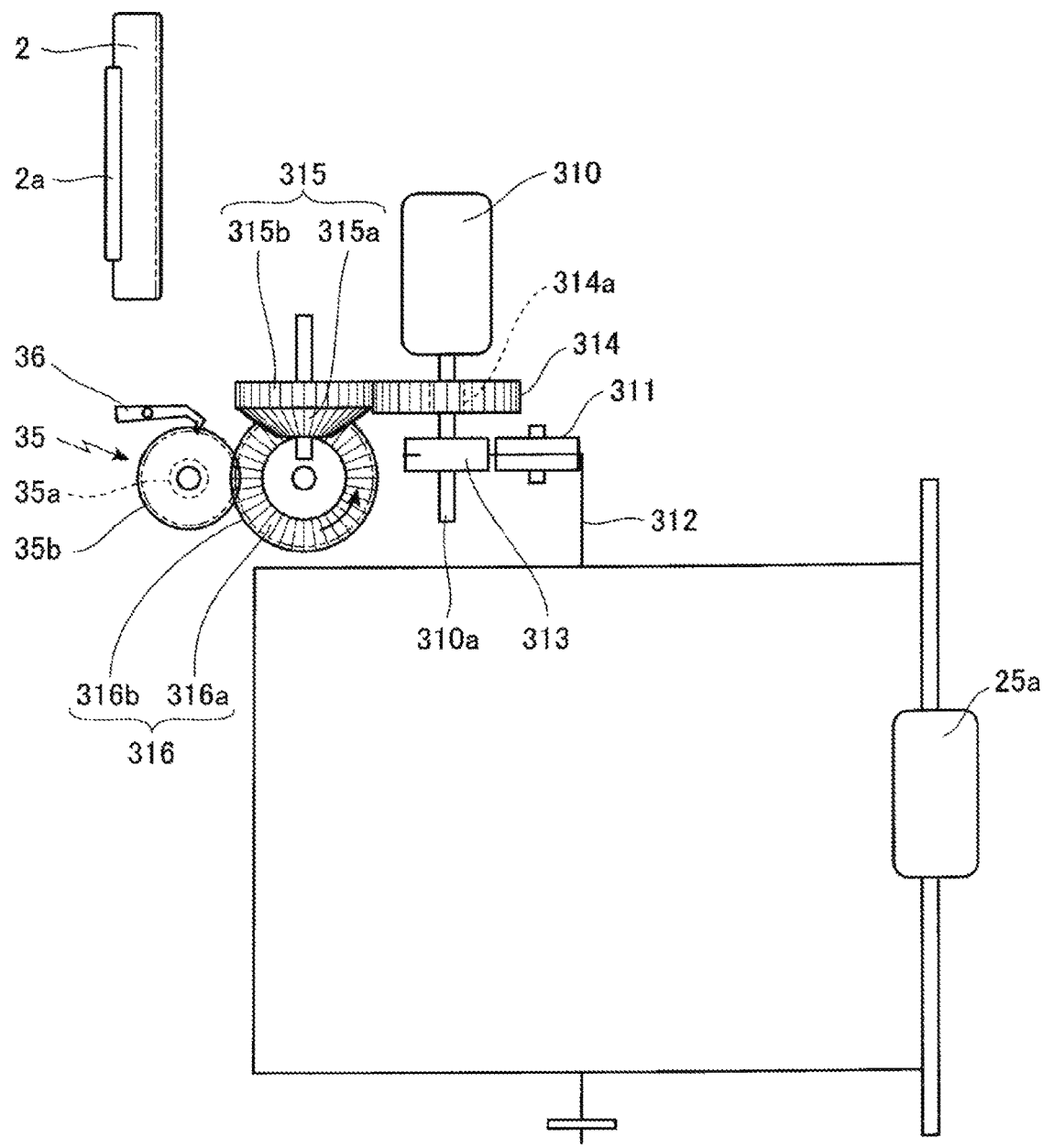
FIG. 9 is a schematic explanatory view of a state viewed from above a push-up plate, showing a second example in which a charge member is charged with energy by using, as a moving member, the push-up plate that is vertically lifted and lowered, in the image forming apparatus according to the embodiment.

When the gear part 35b of the charge member 35 provided in the sheet cassette 30 is engaged with the rack member 2 provided in the apparatus main body 1, to be rotated in the direction of the arrow c2 opposite to that in charging, the sheet cassette 30 is retracted into the apparatus main body 1 along the rack member 2, and the sheet cassette 30 is set at a predetermined position in the apparatus main body 1, as shown in FIG. 8.

In the first example, the bevel gear 33 and the like are provided on the side from which the sheet cassette 30 is withdrawn. However, the bevel gear 33 or the like may be provided on a side into which the sheet cassette 30 is pushed.

Next, description will be given of a second example in which the sheet cassette 30 is inserted into the apparatus main body 1 after the sheet cassette 30 is taken out of the apparatus main body 1, in the above embodiment.

Here, also in this second example, a push-up plate 32 is used as a moving member. For vertically lifting and lowering the push-up plate 32, as shown in FIGS. 9 to 13, while one end of a lifting wire 312 extending downward from a suspension roller 311 provided above the push-up plate 32 is attached to the push-up plate 32, another end of the lifting wire 312 is attached to a wire-winding roller 313 attached to a rotary shaft 310a of a driving device 310 including a motor.

Then, the rotary shaft 310a of the driving device 310 is rotated in a direction of an arrow d1 of winding the lifting wire 312 on the wire-winding roller 313 to lift the push-up plate 32, whereas the rotary shaft 310a of the driving device 310 is rotated in a direction of an arrow d2 of sending out the lifting wire 312 from the wire-winding roller 313 to lower the push-up plate 32.

Further, a gear 314 having a one-way clutch 314a is provided to the rotary shaft 310a of the driving device 310, and there are provided a first rotation transmission gear 315 provided with a gear part 315a engaged with the gear 314 and a bevel gear part 315b, and a second rotation transmission gear 316 having a bevel gear part 316a engaged with the bevel gear part 315b of the first rotation transmission gear 315, and a gear part 316b. The gear part 316b of the second rotation transmission gear 316 is engaged with the gear part 35b of the charge member 35 provided with the charge part 35a to be charged with energy.

In addition, when the charge part 35a of the charge member 35 is charged with energy, in order to suppress a rotation of the gear part 35b of the charge member 35 in the direction opposite to that in charging due to the charged energy while being engaged with a gear part 316b of the second rotation transmission gear 316, a locking member 36 is locked to the gear part 35b of the charge member 35 to suppress free release of the energy charged in the charge part 35a.

Figure 10:
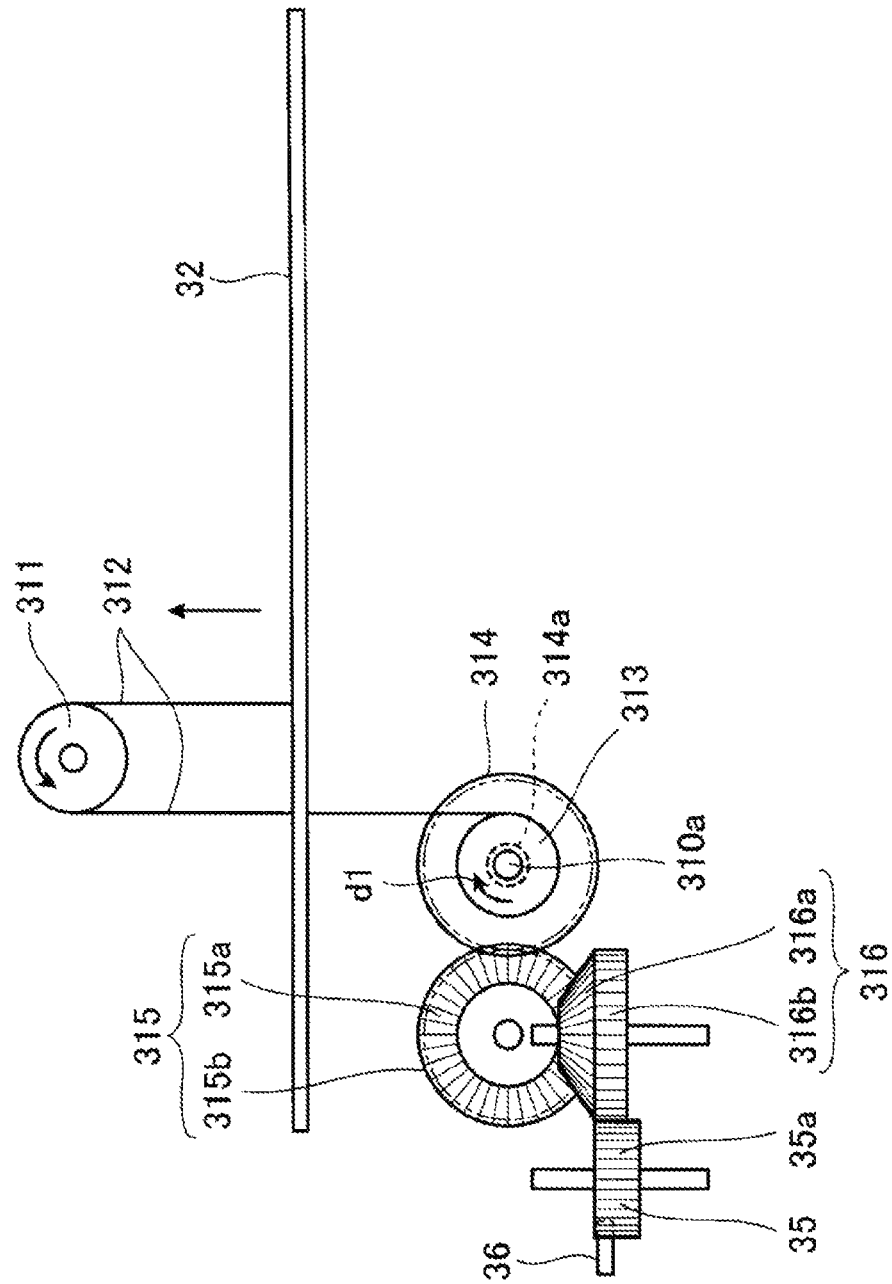
FIG. 10 is a partial schematic side view showing a state where the charge member is not charged with energy when the push-up plate is lifted, in the second example.

Here, in the second example, as shown in FIG. 10, for lifting the push-up plate 32 by rotating the wire-winding roller 313 in the direction of the arrow d1 of winding the lifting wire 312 of the wire-winding roller 313 by the driving device 310, the gear 314 is not rotated due to an action of a one-way clutch 314a provided to the gear 314. Therefore, a first rotation transmission gear 315, the second rotation transmission gear 316, and the charge member 35 are not rotated, and the push-up plate 32 is lifted with the charge part 35a of the charge member 35 being charged with no energy.

Figure 11:
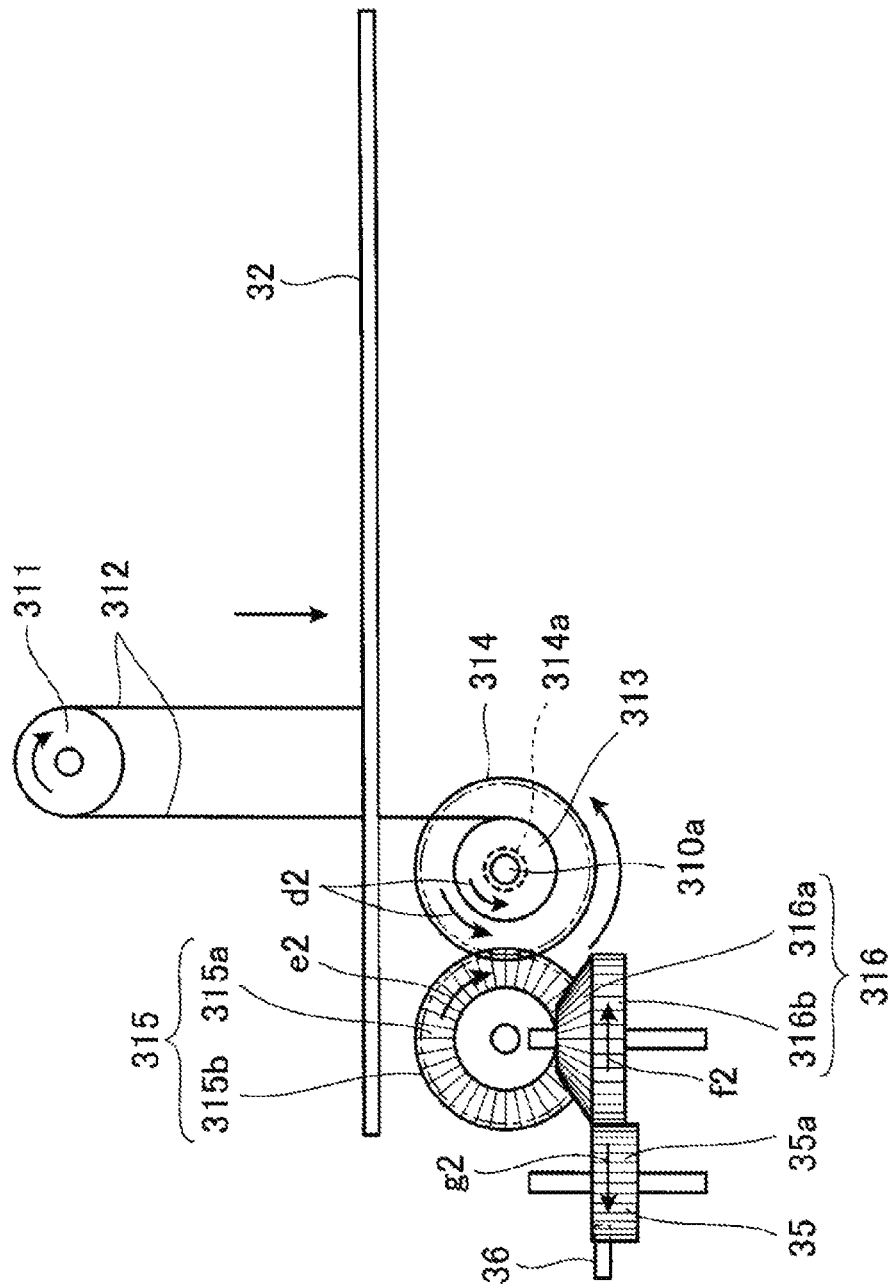
FIG. 11 is a partial schematic side view showing a state where the charge member is charged with energy when the push-up plate is lowered, in the second example.

When the driving device 310 is stopped after the push-up plate 32 is thus lifted to a predetermined height, the wire-winding roller 313 is rotated in the direction of the arrow d2 of sending out the wound lifting wire 312 to lower the push-up plate 32, due to weight of the push-up plate 32 itself or weight of the sheet S (not shown) stacked on the push-up plate 32, as shown in FIG. 11.

When the push-up plate 32 is lowered in this way, the gear 314 is rotated in a same direction as that of the wire-winding roller 313, together with the wire-winding roller 313 in the direction of the arrow d2. Then, the first rotation transmission gear 315 having a gear part 315a engaged with the gear 314 is rotated in a direction of an arrow e2 along with the rotation of the gear 314, and the second rotation transmission gear 316 having a bevel gear part 316a engaged with a bevel gear part 315b of the first rotation transmission gear 315 is rotated in the direction of an arrow f2.

Figure 12:
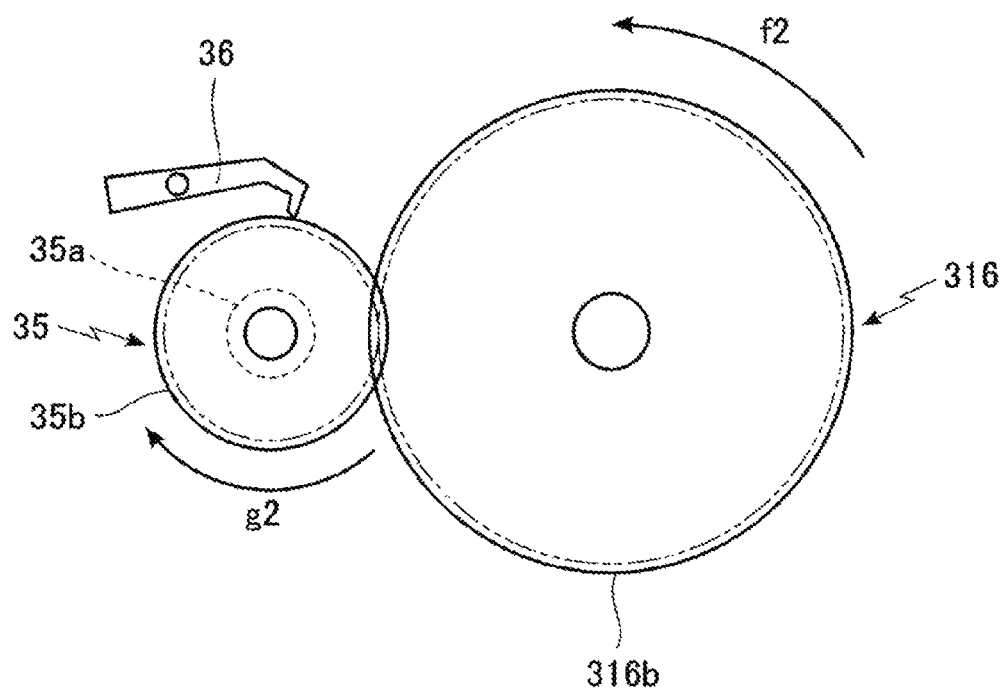
FIG. 12 is a partial schematic explanatory view showing a state where the charge member is charged with energy by rotating the charge member along with a rotation of a second rotation transmission gear, in the second example.

As shown in FIGS. 11 and 12, when the gear part 316b of the second rotation transmission gear 316 is rotated in the direction of the arrow f2 while being engaged with the gear part 35b of charge member 35, the charge member 35 is accordingly rotated in a direction of an arrow g2, and the charge part 35a of the charge member 35 is charged with energy.

Figure 13:
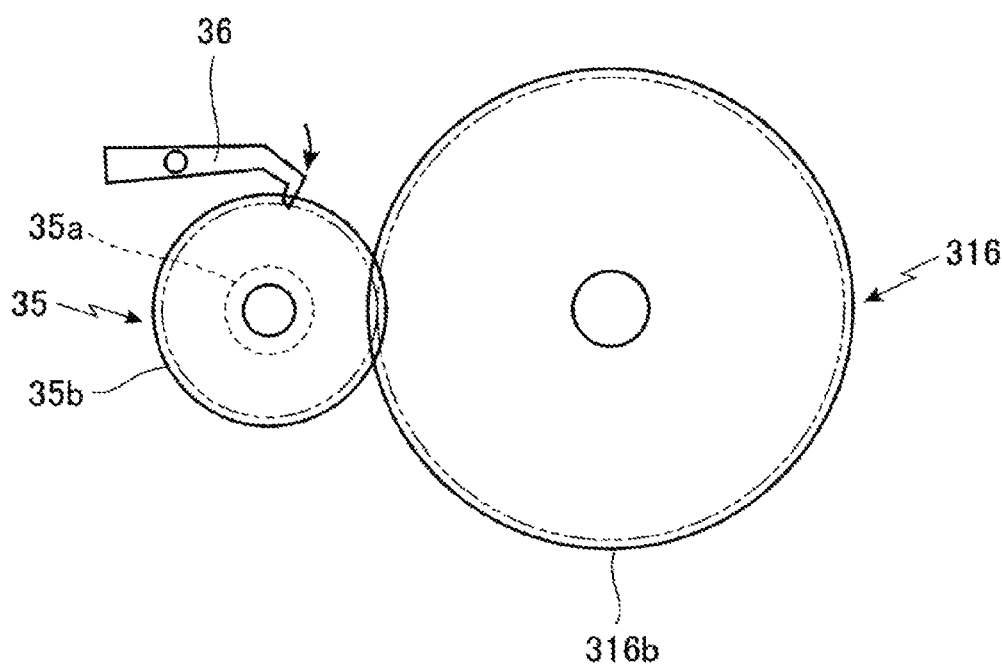
FIG. 13 is a partial schematic explanatory view showing a state where a locking member is locked to the charge member with energy charged in the charge member, to inhibit a rotation of the charge member in the direction opposite to that in charging, in the second example.

After energy is thus charged in the charge part 35a of the charge member 35, as in the case of the first example, the locking member 36 is locked to the gear part 35b of the charge member 35 as shown in FIG. 13 to suppress a rotation of the charge member 35 in the direction opposite to that in charging, to inhibit free release of the energy charged in the charge part 35a.

For inserting the sheet cassette 30 into the apparatus main body 1 in a state where the charge part 35a of the charge member 35 is charged with energy in this manner, as in the case of the first example, the gear part 35b of the charge member 35 is engaged with the rack member 2 provided in the apparatus main body 1, and the locking member 36 that has been locked to the gear part 35b of the charge member 35 is detached from the gear part 35b of the charge member 35 by the unlocking member 2a provided on the rack member 2.

As a result, the energy charged in the charge part 35a of the charge member 35 causes the gear part 35b of the charge member 35 to be engaged with the rack member 2 provided in the apparatus main body 1, and the charge member 35 is rotated in the direction opposite to that in charging, to retract the sheet cassette 30 provided with the charge member 35 into the apparatus main body 1 along the rack member 2, setting the sheet cassette 30 at a predetermined position in the apparatus main body 1.

Next, description will be given of a third example in which the sheet cassette 30 is inserted into the apparatus main body 1 after the sheet cassette 30 is taken out of the apparatus main body 1, in the above embodiment.

Figure 14:
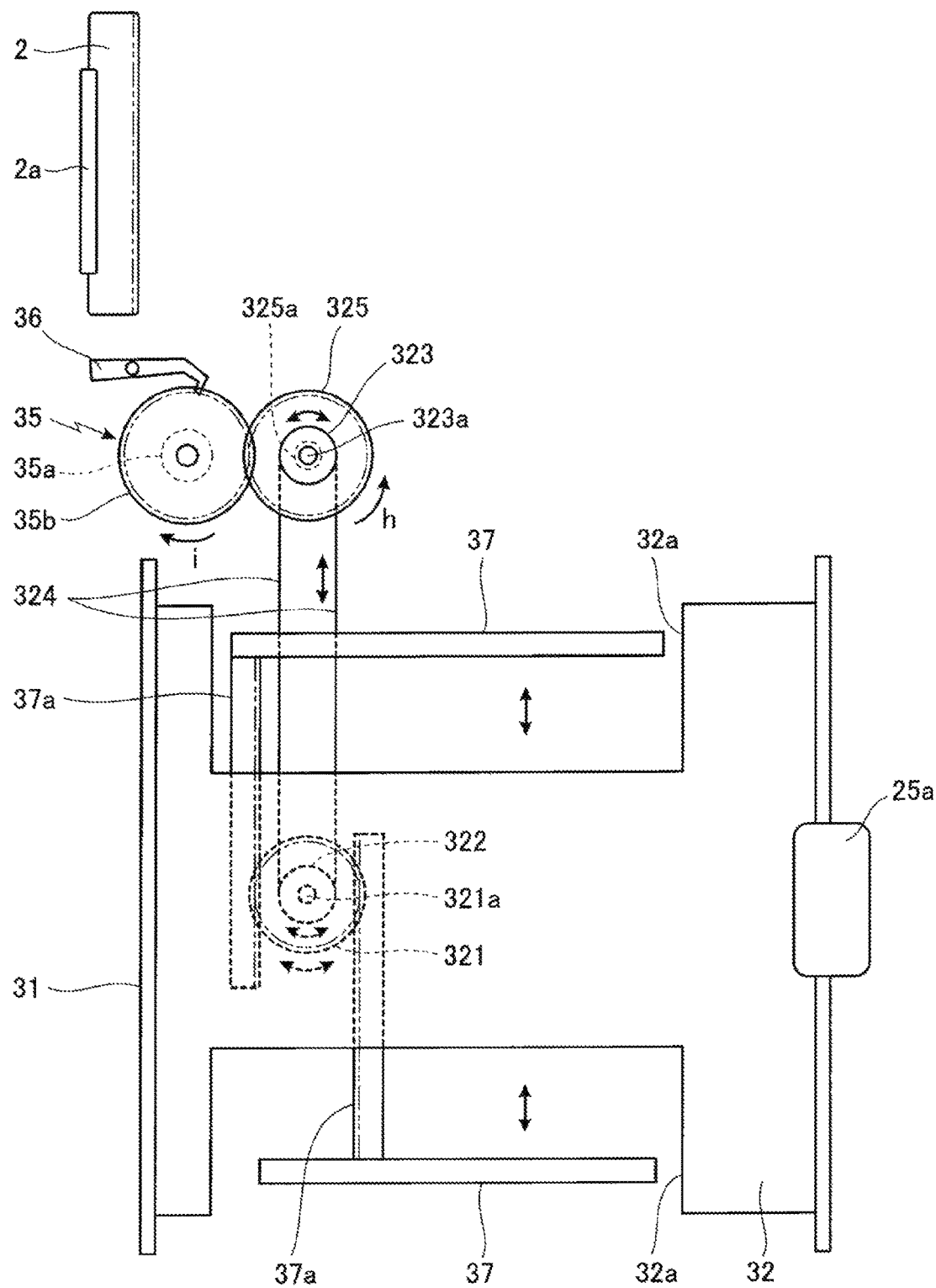
FIG. 14 is a schematic explanatory view of a state viewed from above a push-up plate, showing a third example in which a charge member is charged with energy by using, as a moving member, a regulating plate capable of sliding in a width direction to regulate a position in the width direction of a sheet set on the push-up plate, in the image forming apparatus according to the embodiment.
Figure 15:
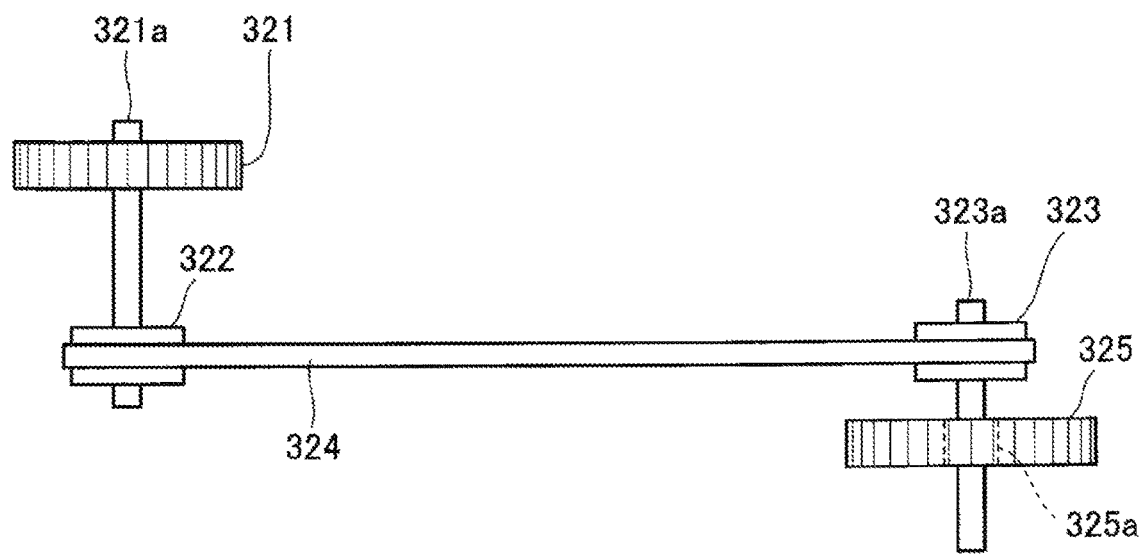
FIG. 15 is a partial schematic explanatory view showing a state where a rotation of a gear rotated along with a movement of the regulating plate is transmitted to a gear having a one-way clutch engaged with a gear part of the charge member by a first pulley, a second pulley, and an endless belt laid between both of the pulleys, in the third example.
Figure 16:
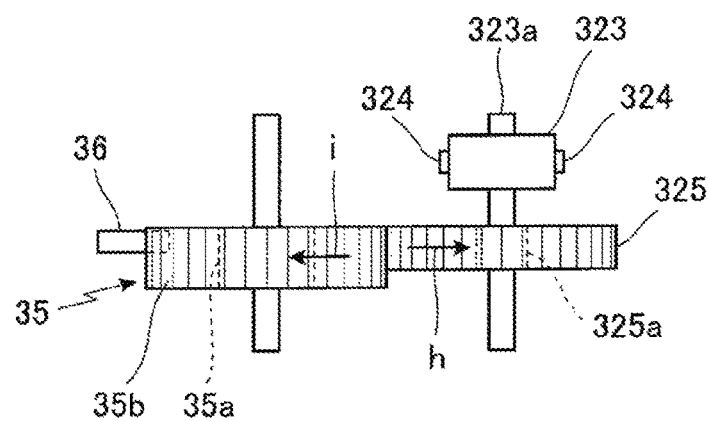
FIG. 16 is a partial schematic explanatory view showing a state where the charge member is charged with energy by the gear having the one-way clutch, in the third example.

In the third example as shown in FIGS. 14 to 16, cut-out parts 32a are provided on both sides in a width direction orthogonal to a sheet feeding direction of a push-up plate 32 that is vertically rotated about the support shaft 31 as a fulcrum. Further, on the cut-out parts 32a on both sides, regulating plates 37 on both sides as moving members are provided capable of sliding in the width direction to regulate a position in the width direction of a sheet S set on the push-up plate 32.

In the third example, rack plates 37a are extended from the regulating plates 37 on both sides toward the respectively opposing regulating plates 37 so as to face each other with a required interval therebetween. Further, between the rack plates 37a, there are provided a gear 321 that is rotated along with a movement of the rack plates 37a, and a first pulley 322 that is rotated together with the gear 321 on a same rotary shaft 321a as that of the gear 321.

A second pulley 323 is provided at a position away from the first pulley 322 on an inserting direction side of the sheet cassette 30, and an endless belt 324 is laid between the first pulley 322 and the second pulley 323, to cause a rotation of the second pulley 323 along with the gear 321 rotated by the movement of the rack plate 37a as described above.

Further, a gear 325 having a one-way clutch 325a is provided to a rotary shaft 323a of the second pulley 323, to engage the gear 325 having the one-way clutch 325a with the gear part 35b of the charge member 35 provided with the charge part 35a to be charged with energy.

Here, the gear 325 provided with the one-way clutch 325a is rotated so as to transmit the rotation in a direction of an arrow h exclusively, which is the direction of charging the charge part 35a of the charge member 35 with energy, due to an action of the one-way clutch 325a. The gear part 35b of the charge member 35 is rotated in a direction of an arrow i along with the rotation of the gear 325 in the direction of the arrow h, causing the charge part 35a in the charge member 35 to be charged with energy.

Thereafter, as in the case of the first and second examples, in a state where the sheet cassette 30 is inserted into the apparatus main body 1 and the charge part 35a is charged with energy, the gear part 35b of the charge member 35 is engaged with the rack member 2 provided in the apparatus main body 1, and the locking member 36 that has been locked to the gear part 35b of the charge member 35 is detached from the gear part 35b of the charge member 35 by the unlocking member 2a provided on the rack member 2.

As a result, the energy charged in the charge part 35a of the charge member 35 causes the gear part 35b of the charge member 35 to be engaged with the rack member 2 provided in the apparatus main body 1, and the charge member 35 is rotated in the direction opposite to that in charging, to retract the sheet cassette 30 provided with the charge member 35 into the apparatus main body 1 along the rack member 2, setting the sheet cassette 30 at a predetermined position in the apparatus main body 1.

In the image forming apparatus according to the first to third examples, when the sheet cassette 30 is withdrawn from the apparatus main body 1, the gear part 35b of the charge member 35 is engaged with the rack member 2 provided in the apparatus main body 1 to cause a rotation of the charge member 35 in a direction opposite to that in inserting, allowing the charge part 35a of the charge member 35 to be charged with energy. However, for withdrawing the sheet cassette 30 from inside the apparatus main body 1 as described above, when the gear part 35b of the charge member 35 is engaged with the rack member 2 to cause the charge part 35a of the charge member 35 to be charged with energy, the force required for withdrawing the sheet cassette 30 from inside the apparatus main body 1 is increased.

Therefore, when the sheet cassette 30 is withdrawn from inside the apparatus main body 1, the gear part 35*b* of the charge member 35 and the rack member 2 of the apparatus main body 1 may be separated from each other.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus provided with a sheet accommodating member that accommodates a sheet and is capable of being inserted into and withdrawn from an apparatus main body, the image forming apparatus comprising:
    a moving member movably supported in the sheet accommodating member;
    a charge member that is charged with energy by a movement of the moving member; and
    a retractor that retracts the sheet accommodating member into the apparatus main body by the energy charged in the charge member, when the sheet accommodating member is inserted into the apparatus main body,
    wherein the moving member is one of:
        a push-up plate on which the sheet accommodated in the sheet accommodating member is stacked, and
        a regulating plate that regulates a position of the sheet accommodated in the sheet accommodating member.

2. The image forming apparatus according to claim 1, wherein the moving member is the push-up plate, and is lifted and lowered, and the charge member is charged with energy along with a downward movement of the push-up plate.

3. The image forming apparatus according to claim 2, wherein the charge member is charged with energy by lowering the push-up plate with weight of a sheet when the sheet is stacked on the push-up plate.

4. The image forming apparatus according to claim 2, further comprising a driving device that moves the push-up plate upward.

5. The image forming apparatus according to claim 4, wherein the charge member is charged with energy by lowering the push-up plate moved upward by the driving device, with self-weight of the push-up plate.

6. The image forming apparatus according to claim 1, wherein the moving member is the regulating plate, and the charge member is charged with energy by moving the regulating plate.

7. The image forming apparatus according to claim 1, wherein the charge member is rotated by the charged energy, a gear part is provided on an outer periphery of the charge member, the retractor is provided with a rack member along a direction of the sheet accommodating member inserted into and withdrawn from the apparatus main body so as to be engaged with the gear part of the charge member, and the gear part is rotated so as to be engaged with the rack member by the energy charged in the charge member, to retract the sheet accommodating member into the apparatus main body.

8. The image forming apparatus according to claim 1, wherein the charge member is charged with energy also by operation of withdrawing the sheet accommodating member out of the apparatus main body.

9. The image forming apparatus according to claim 1, wherein the sheet accommodating member accommodates the sheet in a sheet accommodating portion of the sheet accommodating member, and the moving member is disposed in the sheet accommodating portion or defines a boundary of the sheet accommodating portion.

10. The image forming apparatus according to claim 1, further comprising a locking member that suppresses free release of energy charged in the charge part.

* * * * *